United States Patent [19]

Deerkoski

[11] 4,041,391
[45] Aug. 9, 1977

[54] PSEUDO NOISE CODE AND DATA TRANSMISSION METHOD AND APPARATUS

[75] Inventor: Leonard F. Deerkoski, Crofton, Md.

[73] Assignee: The United States of America as represented by the Administrator of the National Aeronautics and Space Administration, Washington, D.C.

[21] Appl. No.: 645,510

[22] Filed: Dec. 30, 1975

[51] Int. Cl.² .................... H04L 27/10; H04B 15/00
[52] U.S. Cl. ........................ 325/30; 325/42; 325/65; 325/473
[58] Field of Search ................ 325/30, 39, 40, 41, 325/42, 47, 48, 65, 321, 323, 473; 343/176, 203; 178/66, 67

[56] References Cited

U.S. PATENT DOCUMENTS

| | | | |
|---|---|---|---|
| 3,205,443 | 9/1965 | Ludwig | 325/344 |
| 3,344,353 | 9/1967 | Wilcox | 325/41 |
| 3,706,933 | 12/1972 | Bidell et al. | 325/42 |
| 3,737,776 | 6/1973 | Fletcher et al. | 325/40 |
| 3,924,186 | 12/1975 | Gordy et al. | 325/30 |

*Primary Examiner*—Benedict V. Safourek
*Attorney, Agent, or Firm*—Robert D. Marchant; John R. Manning; John O. Tresansky

[57] ABSTRACT

Pseudo noise ranging codes, having a predetermined chipping rate, and a pair of binary data sources, each having a bit rate no greater than one tenth the chipping rate, quadriphase, digitally modulate a suppressed carrier wave having a first frequency. Two additional binary data sources, each having a bit rate that is not restricted by the chipping rate of the first carrier, quadriphase, digitally modulate a suppressed carrier wave having a second frequency. The first and second frequencies are only slightly displaced so that there is overlap in the frequency bands which modulate the two carriers. The two suppressed carrier waves are linearly combined and transmitted from a first station to a second station so that the amplitude of the transmitted first wave is controlled so as not to degrade the detectability of the second wave at the second station. At the second station, the information modulated on the second carrier is coherently detected to recover the two signals modulated on the second carrier. The binary signals modulated on the first carrier are recovered by a pair of matched filters at the second station; the filters respectively include means for deriving the pseudo noise codes transmitted from the first station. The two pseudo noise codes derived at the second station are mixed with the received signal to increase the amplitudes of the two data sources modulating the first wave above the amplitude of the second wave.

12 Claims, 4 Drawing Figures

PSEUDO NOISE CODE AND DATA TRANSMISSION METHOD AND APPARATUS

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates generally to apparatus for and method of transmitting pseudo noise codes and data and more particularly to a transmitting method and apparatus wherein a pair of pseudo noise codes and a first binary data signal quadriphase, digitally modulate a first suppressed carrier and a second binary data signal, having a bit rate on the order of the chipping rate of the pseudo noise codes, digitally, quadriphase modulate a second carrier; the two carriers are simultaneously derived and have a frequency such that there is frequency overlap in the frequency bands of the two carriers.

BACKGROUND OF THE INVENTION

Pseudo noise codes, sometimes referred to as pseudo random binary sources (of the type derived from feedback shift registers), are currently being adopted for two way ranging systems. In two way ranging systems a pseudo noise code is transmitted from a base station to a remote station, including a transponder, which retransmits a pseudo noise code back to the base station. At the base station, the code transmitted from the transponder is coherently detected by a matched filter and the phase difference between the transmitted and received codes is detected to determine the range between the stations. Because of bandwidth limitations, it is desirable to transmit information, represented by binary signals derived asynchronously with the codes, simultaneously with and in the same frequency range as carriers for the pseudo noise codes. One technique that has been proposed involves quadriphase, digital modulation of a suppressed carrier by a pair of pseudo noise codes and a pair of sources of binary data. In particular, the modulo two sum of a first pseudo noise code and a first binary signal is formed to biphase modulate a first component of a carrier. The modulo two sum of the second pseudo noise code and the second data source biphase modulates an orthogonal component of the carrier. The two biphase, orthogonal components are linearly combined to form the digitally, quadriphase modulated suppressed carrier.

The proposed technique can be used only in connection with binary data sources having a bit rate that is no greater than approximately one tenth the chipping rate of the pseudo noise codes, i.e., the bit rate can be no greater than of the order of the chipping rate. (The chipping rate of a pseudo noise code is the rate at which the individual pulses in the pseudo noise code stream are derived and therefore is equal to the code repetition rate divided by the number of members in the code; one pulse of the noise code is referred to as a chip.) Otherwise, intersymbol interference between the data bits and PN code occurs and it is not possible to separate the data bits from the PN chips.

Two techniques have been considered to solve the problem of transmitting asynchronous relatively high frequency binary signals simultaneously with transmission of coherent two way pseudo noise codes. In accordance with one of the techniques, a transmitter at the transponder has a telemetry rate synchronized to the pseudo noise code received by the transponder. This technique has the disadvantage of restricting the telemetry bit rate transmitted from the source. To enable the telemetry rate to be synchronized with the received pseudo noise code, it is necessary to store the asynchronously occurring binary data bits so that they can be transmitted at the same bit rate as the received chip rate. Storing the binary data bits has the primary disadvantage of destroying the time synchronization of the data relative to the remote station clock and the additional disadvantage of increased hardware; also, in certain instances it may not be possible to transmit all of the data bits that are derived from the binary sources.

Another proposed solution to the problem involves synchronizing the returned pseudo noise code chipping rate to the data bit rate with a subcarrier modulated with information containing the relative time difference between the pseudo noise codes received and transmitted from the transponder. This technique is not considered to be adequate because the remote station must make a one way range measurement which is limited in accuracy by the relative time error between the base station clock and the remote station clock. Also, the technique requires continuous monitoring of the relative time between received and transmitted pseudo noise codes at the transponder, thereby increasing the hardware and software complexity at the remote station. A further disadvantage is that non-standardized range measurements must be employed at the base station, thereby increasing the cost of the base station apparatus and software for determining the transponder range. A further disadvantage is that the base station requires additional equipment to detect the relative time difference inserted by the transmitter on the subcarrier.

It is, accordingly, an object of the present invention to provide a new and improved apparatus for and method of telemetering range indicating pseudo noise codes, as well as binary data having a bit rate at least on the order of magnitude of the pseudo noise chipping rate.

Another object of the invention is to provide a new and improved apparatus for and method of simultaneously telemetering, in the same frequency band, pseudo noise ranging codes and binary data.

An additional object of the invention is to provide a telemetering apparatus and method wherein pseudo noise ranging codes are modulated with a relatively low bit rate data stream that is independent of a high bit rate data stream telemetered simultaneously with and in the same frequency band as the ranging codes.

BRIEF DESCRIPTION OF THE INVENTION

In accordance with the present invention, a data link between a pair of remote stations is formed by simultaneously transmitting a first suppressed carrier wave quadriphase modulated by pseudo noise ranging codes and a binary data signal having a bit rate that is less than an order of magnitude of the pseudo noise code chipping rate and a second suppressed carrier wave quadriphase modulated with a binary signal having a bit rate at least of the order of the chipping rate; the frequencies of the two suppressed carriers are relatively close to each other so that the frequency bands of the transmitted signals overlap. To enable the information on the two suppressed carrier waves to be separated from each other at a receiver, the transmitted effective isotropic radiated power (EIRP) of the first carrier wave is controlled so as not to degrade the detectability of the second wave at the receiver. The EIRP of the two carrier waves is a function of the bit rate of the data stream modulating the second carrier, whereby for increasing bit rates of the modulation on the second carrier, the EIRP of the second carrier is increased relative to that of the first carrier.

Plural coherent detectors of a receiver are driven in parallel by the two suppressed carrier waves. A first coherent detector responds only to the second wave and ignores the information modulated on the first carrier because of the relative amplitudes of the two waves. A second coherent detector means includes a matched filter means to detect the pseudo noise code modulating the first suppressed carrier. Thereby, the second coherent detector means reduces the frequency spectrum of the first carrier relative to that of the data modulating the first carrier. The energy density of the first carrier data is thereby increased relative to the second carrier data thus preventing the second carrier from interfering with the second coherent detector.

In one particular arrangement, the first wave is is modulated by a pair of pseudo noise codes, each of which is separately combined with a different, relatively low frequency data source. The second coherent detector means includes a pair of matches filters, one for each of the noise codes. Thereby, a first of the matched filters derives a wave having a relatively high amplitude compared to the amplitude of the second noise code and the data source with which it is combined. The high amplitude wave is coherently detected; the data and noise code components are separated by coherent detection. A second matched filter and coherent detector respond similarly to the second pseudo noise code and the binary data combined with it.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
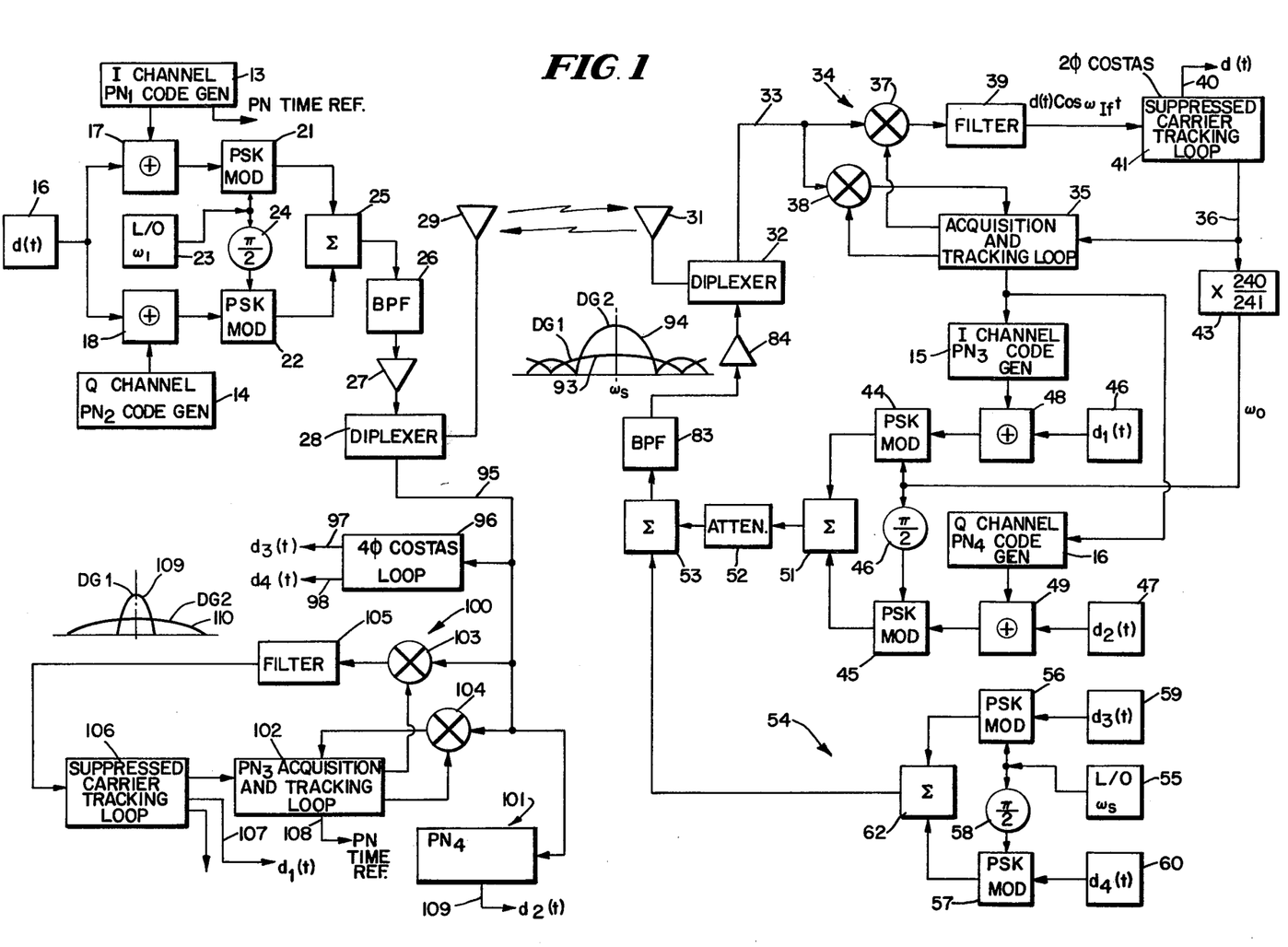
FIG. 1 is a block diagram illustrating a full duplex system for transmitting data and pseudo noise codes in two directions between a pair of remote sites.

Reference is now made to FIG. 1 of the drawing wherein there is illustrated apparatus for enabling data and pseudo random ranging codes to be telemetered between base station 11, and a remote, movable station 12 that includes a transponder. Station 11 transmits information signals and pseudo noise ranging codes to station 12, which responds to them to transmit additional information signals and pseudo noise codes back to station 11.

To enable the position of station 12 to be determined relative to station 11, each of the stations is provided with a pair of pseudo noise code generators of the feedback shift register type. Pseudo noise generators 13 and 14 of station 11 generally have the same sequence of binary bits, but are displaced one half a code length (epoch) from each other. Pseudo noise code generators 15 and 16 of station 12 are also generally the same as each other and are phased so that they are one half a code length apart. Code generators 13 and 14 at station 11 may or may not be the same as the code generators 15 and 16 at station 12; however, the length of the codes derived by each of the generators 13–16 must be the same. At both stations, the pseudo noise codes are combined with signals derived from binary data sources having bit rates that are asynchronous with respect to the chipping rates of the code generators; the bit rates are no greater than one tenth the chipping rates of the code generators. The code generator outputs are combined with the data signals to form resultant binary signals that modulate a pair of carrier waves having orthogonal phases; the waves are combined together to form a suppressed carrier, digitally, quadriphase modulated wave. The two pseudo noise codes modulating each of the orthogonal carriers are preferably staggered one half a chip length to provide greater isolation between them and enable the two orthogonal components of the suppressed carrier to be more easily separated at the other station. Also, the data sources are preferably convolution coded to increase transmission efficiency between the two stations.

To these ends, station 11 includes a binary data source 16 that drives exclusive OR gates 17 and 18 in parallel. The bit rate of the data stream derived from the source 16 is no greater than one tenth the chipping rate of generators 13 and 14, the outputs of which are respectively applied to gates 17 and 18. The phase of generator 13 is advanced one half a chip relative to the phase of generator 14 to provide the staggered pseudo noise codes. The binary output signals of exclusive OR gates 17 and 18 are respectively applied to phase shift key modulators 21 and 22 which are responsive to orthogonal components of local oscillator 23, having an angular frequency $\omega_1$. To this end, the output of oscillator 23 is applied directly to modulator 21 and is applied in parallel through 90° phase shifter 24 to modulator 22. The output signals of modulators 21 and 22 are linearly combined in summing network 25, which derives a suppressed carrier wave that is digitally quadriphase modulated. Mathematically, the output signal of summing network 25 can be represented as:

$$[\,d(t) \oplus PN_1\,] \cos \omega_1 t + [\,d(t) \oplus PN_2\,] \sin \omega_1 t \qquad (1)$$

where:

$d(t)$ = the binary data stream derived from source 16,
$PN_1$ = the output of code generator 13, and
$PN_2$ = the output of code generator 14.

The output signal of summing network 25, as represented by Equation (1), is applied to bandpass filter 26, having a center frequency coincident with the frequency of local oscillator 23 and a bandpass that accommodates approximately 85% of the modulation derived from summing network 25. The output signal of bandpass filter 26 is applied to a hard limiter, comprising Class C amplifier 27 that is biased to saturation. Amplifier 27 functions as a zero crossing detector so that it derives a bi-level output signal having an amplitude dependent upon the amplitude of the output of filter 26 relative to a zero level. The output of amplifier 27 is applied to one terminal of diplexer 28, having a second terminal that is connected to antenna 29.

Antenna 29 radiates a signal represented by Equation (1) from station 11 to station 12. At station 12, the signal represented by Equation (1) is transduced by antenna 31 and coupled to one terminal of diplexer 32. Another terminal of diplexer 32 is connected to lead 33 on which is derived a signal represented by Equation (1), except for noise components resulting from transmission between stations 11 and 12.

The data modulating the signal on lead 33 is separated from the pseudo noise codes by circuit 34 which includes an acquisition and dithered tracking loop 35 which functions as a matched filter and is preferably of the type generally disclosed by Hartmann, IEEE Transactions On Aerospace And Electronics Systems, January 1974, pages 2-8. In general, loop 35 includes a pair of pseudo noise code generators having the same codes as the pseudo noise generators 13 or 14 at station 11; output signals of these local code generators modulate orthogonal components of a carrier supplied by lead 36 to 35. The modulated components are combined to form a suppressed carrier signal that is combined with the similarly modulated signal on lead 33. During acquisition, loop 35 responds to a variable frequency signal derived by circuit 34 on lead 36 to step the phase of the pseudo noise code derived therefrom in discrete steps, each having a length of ½ chip. When the phase of the pseudo noise code derived from loop 35 is such that all of the chips in one code sequence derived from loop 35 are aligned with all of the chips of the received sequence, within a ½ chip interval, loop 35 goes from the acquisition mode into the tracking mode wherein the received and locally derived pseudo noise codes are in complete alignment, i.e., each of the received and locally derived chips are exactly in phase with each other. To these ends, circuit 34 includes a punctual (on time) mixer 37 and a dithered mixer 38, driven in parallel by the signal on lead 33. Mixers 37 and 38 are also separately responsive to two different suppressed carrier, digital, quadriphase modulated outputs of loop 35. The output signal of mixer 38 is, in effect, an error signal which dithers loop 35 to maintain the pseudo noise code supplied by the loop to mixer 37 in exact phase with the pseudo noise code on lead 33. The signal supplied by loop 35 to mixer 37 can be mathematically represented as:

$$PN_1 \cos \omega_R t + PN_2 \sin \omega_R t \qquad (2)$$

where:

$\omega_R$ = the angular frequency of the signal on lead 36.

Mixer 37 responds to its two inputs to derive an IF output that is coupled to loop filter 39 which derives an IF output signal represented by:

$$d(t) \cos \omega_{IF} t \qquad (3)$$

where:

$\omega_{IF} = \omega_1 - \omega_R$.

The output signal of filter 39 is coupled to a suppressed carrier tracking loop 41 which may be a two phase Costas loop described in the December 1956 Proceedings of the IRE, pages 1713ff. Loop 41 functions as a coherent detector for the output of filter 39 to derive, on lead 40, a baseband signal that is a replica of $d(t)$, derived from data source 16, as well as a variable frequency output, $\omega_R$, that is derived on lead 36 in response to the output of a voltage controlled oscillator in loop 41.

In response to the pseudo noise code locally generated in loop 35 being exactly in alignment with the pseudo noise code on lead 33 and a predetermined phase position of the code occurring (e.g., the beginning of an epoch), the loop derives a binary one output signal that is applied in parallel to pseudo noise code generators 15 and 16. The binary one signal supplied by loop 35 to code generators 15 and 16 initiates operation of code generators 15 and 16 and maintains the chips supplied by the code generators to a transmitter in time coincidence with the chips in the pseudo noise code modulating the signal on lead 33. To this end, loop 35 includes apparatus for delaying the derivation of the binary one signal that initiates the operation of generators 15 and 16, thereby to compensate for any inherent delay that may be involved in transmitting a chip from station 12 relative to the reception of a corresponding chip by station 12. Hence, the first chip transmitted from station 12 of a pseudo noise code derived by generator 15 is in time coincidence with the first chip in a pseudo noise code sequence $PN_1$ that modulates the signal on lead 33; similarly, the first chip in a pseudo noise code derived from generator 16 is transmitted from station 12 in time coincidence with the first chip in the pseudo noise code sequence $PN_2$ that modulates the signal on lead 33.

Circuit 34 thereby derives two reference outputs; via.: a binary one signal having a time position correlated with and indicative of the time of reception of the pseudo noise signal at station 12 to indicate the distance between stations 11 and 12 and maintain pseudo noise code generators 15 and 16 in synchronism with the pseudo noise codes received at station 12, thereby enabling the pseudo noise codes derived by generators 15 and 16 to be transmitted from station 12 to station 11 and enable the latter to determine the distance between the two stations; and a reference frequency, $\omega_R$, which is frequency translated from the received suppressed carrier, $\omega_1$, to form a carrier, $\omega_0$, for the pseudo noise codes and low bit rate data that are derived in circuit 50 and transmitted from station 12 to station 11.

Translation of the $\omega_R$ frequency on lead 36 to the carrier frequency, $\omega_0$, on which the low bit rate data and pseudo noise codes are modulated is performed by frequency scaler 43 having a frequency multiplication factor of 240/241. The $\omega_0$ output frequency of scaler 43 is applied as a pair of components having orthogonal phases to phase shift key modulators 44 and 45. The output frequency of scaler 43 is applied directly to modulator 44; the output of scaler 43 is applied to modulator 45 via 90° phase shifter 46. Low bit rate, asynchronous, convolution coded binary data sources 46 and 47 derive signals that are respectively combined with the pseudo noise codes derived by generators 15 and 16 in exclusive OR gates 48 and 49. Sources 46 and 47 are considered to have low bit rates since the bit rates thereof are no greater than one tenth the chipping rate of the pseudo noise codes derived by generators 15 and 16.

Exclusive OR gates 48 and 49 derive binary wave trains (together sometimes referred to as data group 1, DG1,) that are respectively applied to the modulating input terminals of modulators 44 and 45. The output signals of modulators 44 and 45 are combined in summing network 51, that derives an output wave represented by:

$$[d_1(t) \oplus PN_3] \cos \omega_0 t + [d_2(t) \oplus PN_4] \sin \omega_0 t \quad (4)$$

where:

$d_1(t)$ and $d_2(t)$ respectively indicate the output signals of data sources 46 and 47, and
$PN_3$ and $PN_4$ respectively indicate the pseudo noise codes derived from generators 15 and 16.

The pseudo noise codes derived from generators 15 and 16 are displaced one half a chip from each other so that there is staggered pseudo noise modulation of the two orthogonal components supplied to summing network 51; the two pseudo noise components thereby have greater isolation so they are more easily separated when received at station 11.

The suppressed carrier, digitally quadriphase modulated output wave of summing network 51 is applied to attenuator 52, having an output which is supplied to one input of summing network 53. The other input to summing network 53 is a suppressed carrier, digitally quadriphase modulated wave representing a pair of relatively high bit rate binary data source, i.e., sources wherein the bit rate may be greater than one tenth the chipping rate of sources 15 and 16. The wave supplied to summing network by attenuator 52 is controlled so as not to degrade the detectability of the suppressed carrier wave representing the high bit rate data sources when received at station 11.

Circuit 54 includes a local oscillator 55, having a frequency $\omega_s$ selected so that it is incoherent with the carrier frequency $\omega_0$ for data sources 46 and 47 and pseudo noise codes derived by generators 15 and 16. However, $\omega_s$ is only slightly displaced from $\omega_0$ so that there is overlap in the frequency bands applied by circuits 50 and 54 to the inputs to summing network 53. Thereby, all of the information transmitted from station 12 to station 11 is in the same frequency band and there are no excess spectral requirements.

To derive the output of circuit 54, orthogonal components of oscillator 55 are applied to modulating inputs of phase shift key modulators 56 and 57. The output of oscillator 55 is applied directly to modulator 56; the output of oscillator 55 is applied through 90° phase shifter 58 to the input of modulator 57. Data input signals, referred to as data group 2 (DG2), are respectively applied to modulators 56 and 57 by asynchronous, relatively high bit rate binary data sources 59 and 60 that are preferably convolution coded; the bit rates of sources 59 and 60 are in general at least equal to or greater than one tenth the chipping rates of generators 15 and 16. If there is adequate bandwidth available in the link between stations 12 and 11, the bit rate of data sources 59 and 60 may even be considerably in excess of the chipping rate of generators 15 and 16. The output signals of modulators 56 and 57 are linearly combined in summing network 62, which derives a suppressed carrier, digitally quadriphase modulated output wave represented by:

$$d_3(t) \cos \omega_s t + d_4(t) \sin \omega_s t \quad (5)$$

where:

$d_3(t)$ and $d_4(t)$ respectively indicate the output signals of sources 59 and 60.

The output signal of summing network 62 is applied to summing network 53.

The suppressed carrier output waves of summing network 53 are applied to bandpass filter 83, having a center frequency that is approximately equal to the carrier frequencies $\omega_O$ and $\omega_s$, and a bandwidth of approximately 85% of the bandwidth of the signal supplied to summing network 53 from either attenuator 52 or summing network 62, whichever is greater. The output signal of bandpass filter 83 is applied to Class C amplifier 84 that is biased for saturation and functions as a zero crossing hard limiter. The output signal of amplifier 84 is applied to an input of diplexer 32 and is coupled by the diplexer to antenna 31 for transmission to station 11. Thereby, a pair of suppressed carrier, digitally quadriphase modulated waves are simultaneously transmitted from station 12 to station 11. The effective isotropic radiated power (EIRP) of the wave having a carrier $\omega_s$ is in general considerably greater than that of the wave having a carrier $\omega_O$; the EIRP's of $\omega_O$ and $\omega_s$ are determined by the setting of attenuator 52 and the output power of amplifier 84.

The relative EIRP's of $\omega_O$ and $\omega_s$ are functions of the bit rates of DG1 and DG2, i.e., sources 46, 47, 59 and 60, as well as the chipping rates of generators 15 and 16. As the bit rate of DG2 increases, the EIRP of $\omega_s$ must increase to maintain a constant bit error rate. As the EIRP of $\omega_s$ increases, the EIRP of $\omega_O$ must also increase to maintain a constant bit error rate for the data from sources 46 and 47.

Figure 2:
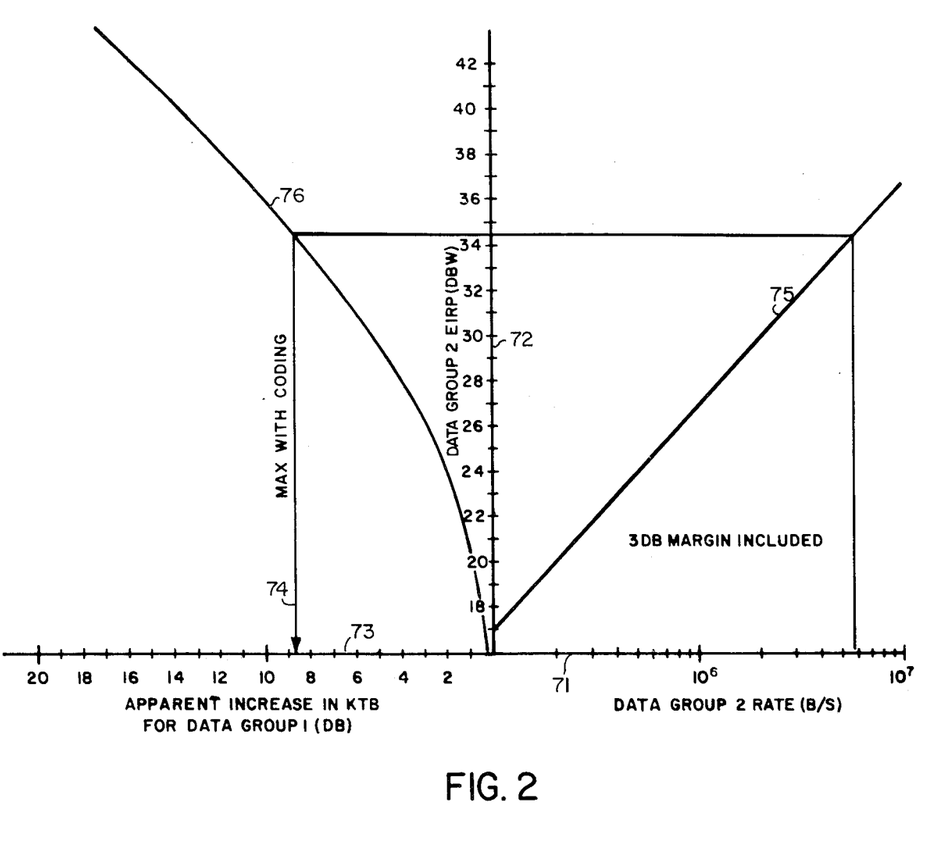
FIGS. 2 and 3 are charts which, together, indicate the relative power in the two suppressed carriers as a function of the high and low bit rates which modulate the carriers.

In FIG. 2 there is illustrated a plot of the effect of EIRP for $\omega_s$ (DG2) upon the apparent increase in noise level for $\omega_O$ (DG1) as received at station 11 for a PN rate of six M chips/second on DG1. The DG2 bit rate is plotted, in bits per second, along line 71, to the right of vertically extending line 72 which indicates the required EIRP for $\omega_s$. To the left side of line 72, along line 73, is indicated the apparent increase in noise, as calculated by KTB, the product of Boltzmann's constant, temperature in degrees Kelvin, and bandwidth, for DG1 as detected in station 11. To determine the EIRP required by DG2 on the transmitted output of station 12, for a particular bit rate of sources 59 and 60, the bit rate value is located along line 71 and is projected upwardly to line 75. For a DG2 data rate of six M bits/second, the intersection of line 75 with the bit rate along line 71 is projected horizontally to an intersection along line 72 to determine the EIRP of DG2. To determine the increase in noise on DG1 for the particular bit rate of sources 59 and 60, the horizontal line between lines 75 and 72 is continued to the left, to an intersection with curved line 76. At the intersection of curved line 76, a vertical line is drawn and projected onto line 73. The intersection between the vertical line and line 73 is an indication of the apparent increase in noise on DG1 in transmission between stations 12 and 11. The link threshold for DG1 without interference from DG2 is O dbw. Therefore the increase in KTB, defined by FIG. 2, correspondingly increases the threshold EIRP required for DG.

The EIRP of DG1 can similarly increase the noise for DG2. This is prevented by selecting a value for attenuator 52, that in conjunction with the output power of amplifier 84, results in an EIRP of DG1 which does not measurably increase the noise for DG2. For the application illustrated, a maximum EIRP for DG1 of 16 dbw will result in no significant noise increase for DG2.

Figure 3:
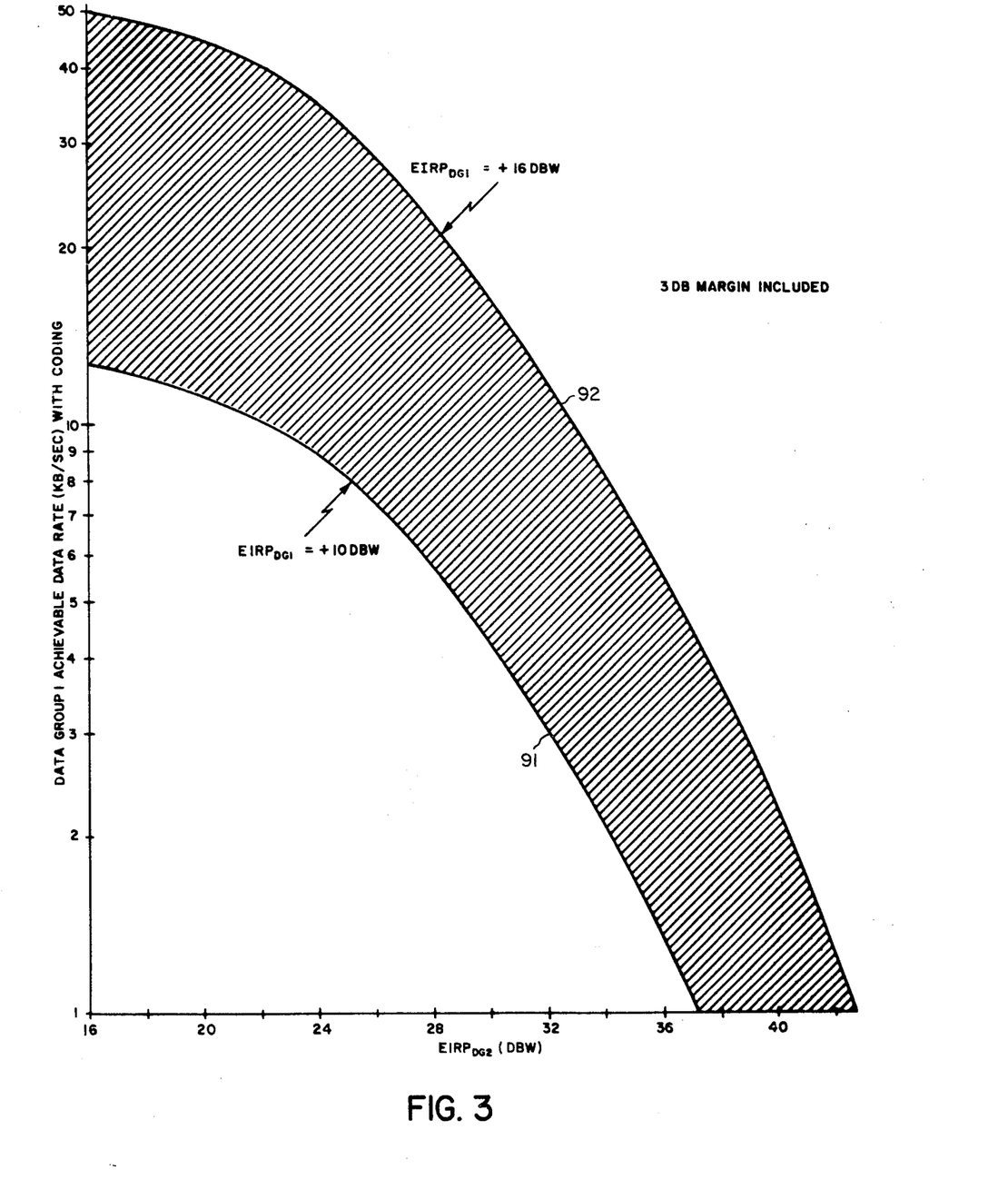

In FIG. 3, the EIRP for DG2 is plotted against the bit rate of sources 46 and 47 for which acceptable data quality results. In addition, there are illustrated constant EIRP lines 91 and 92 for minimum and maximum DG1 EIRP levels of +10 dbw (approximate threshold when DG2 data rate = 6 M bits/second) and +16 dbw (maximum DG1 EIRP to not effect DG2). The data rates of sources 59 and 60 of FIG. 1 are used to define the required DG2 EIRP using lines 71, 72 and 75 of FIG. 2. The required DG2 EIRP is then used in FIG. 3 to define the maximum data rate that can be simultaneously supported by DG1. The shaded region in FIG. 3 represents the range of maximum DG1 data rates that can be supported depending upon actual DG2 EIRP and actual DG1 EIRP where DG1 EIRP is restricted as discussed previously.

The amplitude v. frequency responses of the two suppressed carriers ($\omega_O$ and $\omega_s$) transmitted from station 12 to station 11 are respectively plotted on FIG. 1 by curves 93 and 94 for a typical set of data sources 46, 47, 59 and 60. The maximum values of responses 93 and 94 are both approximately centered on the same frequency and the maximum amplitude of response 94 is considerably in excess of that of response 93. Also, the frequency bands of responses 93 and 94 are of the same order of magnitude, as indicated by the proximity of the null points of the two responses closest to the center frequency thereof.

The signals transmitted from station 12 to station 11 are transduced by antenna 29 and coupled by diplexer 28 to lead 95. The high amplitude response 94, having a carrier frequency $\omega_s$, is coherently detected by four phase Costas loop 96 which is driven by the signal on lead 95. Costas loop 96 responds to response 94, rather than response 93, because a local oscillator in the Costas loop locks onto the higher amplitude response to the exclusion of the lower amplitude response 93; the lower amplitude response 93 has an amplitude that is less than the threshold of Costas loop 96. Costas loop 96 responds to response 94 to derive output signals on leads 97 and 98 that are respectively replicas of the data sources 59 and 60 at station 12.

Coherent detecting channels 100 and 101 are driven in parallel by the signal on lead 95 to respectively detect the signals originating at data sources 46 and 47; detectors 100 and 101 also respectively detect the pseudo noise codes derived by generators 15 and 16. Detectors 100 and 101 are substantially the same, except that detector 100 includes a pseudo noise code generator that is identical to pseudo noise code generator 15 while detector 101 includes a pseudo noise generator identical to code generator 16. Basically, detector 100 removes only the $PN_3$ modulation for one orthogonal component of $\omega_O$, thereby increasing the energy density of the data from source 46 relative to both the data from source 47 which still contains PN modulation due to code generator 16, and the data from sources 59 and 60 which maintain the spectral distribution defined by response 94. Detector 101 correspondingly increases the energy density of the data from source 47 relative to all other sources. Thereby, in detector 100 there is derived a relatively high amplitude response indicative of the signal derived from data source 46 and the code derived from generator 15, while in detector 101 there is derived a relatively high amplitude response indicative of the signal derived from source 47 and the code derived by generator 16. In each of detectors 100 and 101, the realtively high amplitude responses are coherently detected, to the exclusion of the low amplitude responses.

Since detectors 100 and 101 are substantially the same, a description of detector 100 suffices for both. Detector 100 includes an acquisition and tracking loop 102 having a pseudo noise code generator that is identical to code generator 15, at transducer 12. Loop 102 is substantially the same as loop 35, except for the difference in the pseudo noise code generators thereof; loop 102 derives an on time output that is applied to mixer 103, as well as an error output that is applied to mixer 104. Mixers 103 and 014 are driven in parallel by the signal on lead 95 to derive signals that are respectively applied to bandpass filter 105 and a bandpass filter included in loop 102. The output signal of filter 105 includes a relatively high amplitude response 109 that contains the information of source 46. Filter 105 includes a low amplitude response 110 that contains the information of data sources 47, 59 and 60, as well as the code derived from generator 16. High amplitude response 109 is coherently detected to the exclusion of low amplitude response 110 by suppressed carrier tracking loop 106 that is preferably a two phase Costas loop. Tracking loop 106 includes a voltage controlled oscillator which supplies one input to acquisition and tracking loop 102, as well as means for deriving an output signal on lead 107 that is a replica of the data derived from source 46.

Loop 102 responds to its input signals to derive, on lead 108, a binary one signal when a predetermined segment of the pseudo noise code coupled to it by mixer 104 has been reached. The occurrence time of the binary one output on lead 108 is compared with the occurrence time of a similar output from code generator 13 to enable the distance between stations 11 and 12 to be determined.

Detector 101 responds to the signal on lead 95 to derive a relatively high amplitude response indicative of the data derived from source 47 and the code derived from generator 16. The high amplitude response is coherently detected in detector 101 by a suppressed carrier tracking loop which derives an output signal on lead 109 that is a replica of the signal derived from source 47.

Figure 4:
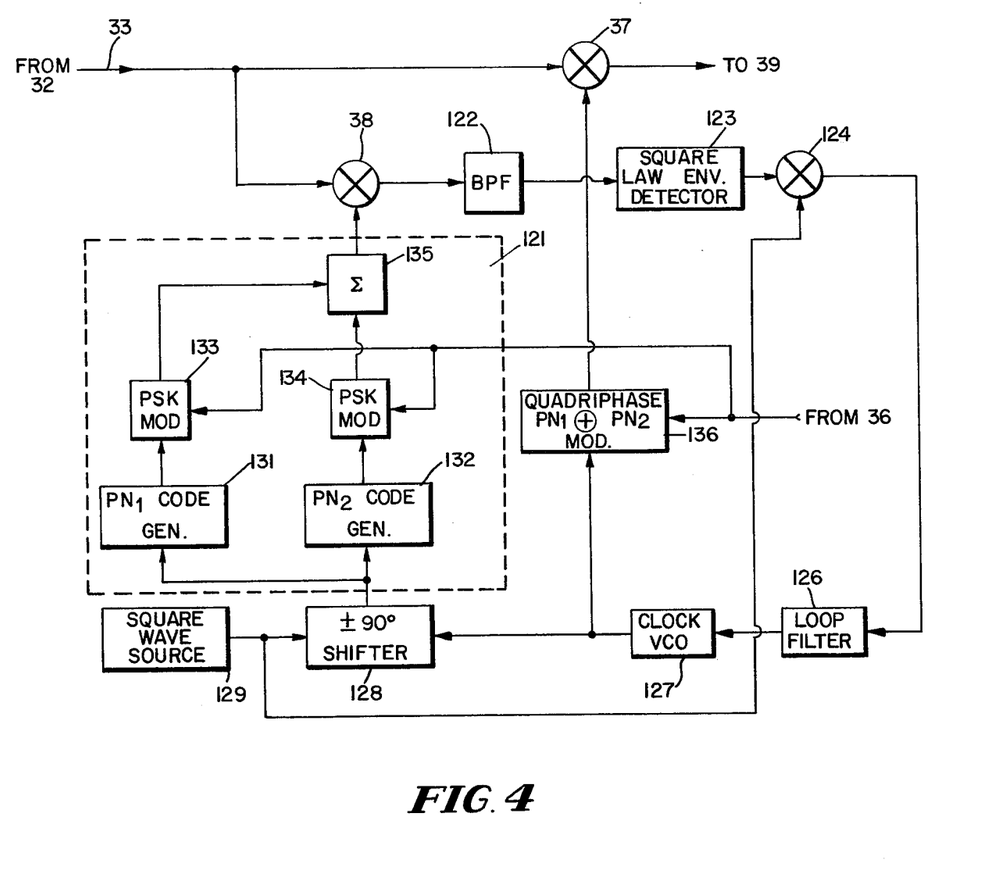
FIG. 4 is a block diagram illustrating a preferred configuration for a tracking loop used with the present invention.

Reference is now made to circuit 34 as illustrated in FIG. 4 of the drawing wherein there is illustrated a block diagram of a typical acquisition and tracking loop, such as loop 35 in FIG. 1 or the acquisition and tracking loops included in detectors 100 and 101 in FIG. 1. Basically, loop 35 is similar to the loop disclosed by Hartmann, previously cited, but includes certain refinements applicable to the particular situation considered herein. While the acquisition and tracking loop is described in connection with circuit 34, it is to be understood that similar connections exist between the described loop and the other loops in detectors 100 and 101. Differences between the loops are specifically set forth; however, it should be understood that while detectors 100 and 101 are designed to detect independent data signals originating from sources 46 and 47, they can be replaced by a single detector functionally equivalent to circuit 34 and suppressed carrier tracking loop 41 for detecting a single data signal originating from a single data source replacing independent data sources 46 and 47.

Loop 35 includes mixer 38 that is responsive to the signal on lead 33, as well as a dithered quadriphase wave modulated by the $PN_1$ and $PN_2$ codes derived by PN generators equivalent to generators 13 and 14. The quadriphase signal is supplied to mixer 38 by network 121, on a suppressed carrier at the output frequency of loop 41, on lead 36. Mixer 38 responds to its two input signals to derive a dithered IF output signal that is supplied to IF bandpass filter 122, having a sufficient bandwidth to pass the data modulating the carrier on lead 33, as well as variations in the carrier. The output signal of bandpass filter 122 is supplied to a square law envelope detector 123 which derives a DC signal that is coupled to one input of mixer 124, the other input of which is responsive to the output of square wave source 129. The output of mixer 124 is supplied to loop filter 126 that drives clock voltage controlled oscillator 127. Oscillator 127 drives ± 90° phase shifter 128, having a control input responsive to the output of square wave source 129 to derive a biphase output at the frequency of oscillator 127. The operation of clock voltage controlled oscillator 127, phase shifter 128 and square wave source 129 is described more fully in the Hartmann article. The output of phase shifter 128 is applied to quadriphase modulator 121 that supplies a quadriphase input to mixer 38.

Quadriphase modulator 121 includes code generators 131 and 132 which respectively have the same codes as generators 13 and 14 at station 11. The chipping rate of the outputs of generators 131 and 132 is determined by the clock VCO127. The instantaneous phase of the outputs of code generators 131 and 132 is determined by source 129 which dithers the phase of the clock VCO output via phase shifter 128. The pseudo noise codes derived by generators 131 and 132 are respectively applied to phase shift key modulators 133 and 134, which are also driven by the output of tracking loop 41 on lead 36. The biphase output signals of modulators 133 and 134 are linearly combined in summing network 135 which derives the suppressed carrier, digitally quadriphase signal that is applied to mixer 38.

To derive the signal coupled to punctual mixer 37, the output signal of clock voltage controlled oscillator 127 is applied to suppressed carrier quadriphase modulator 136 that is identical to modulator 121. The output signal of modulator 136 is applied to punctual mixer 37, which derives an IF signal that is fed to IF filter 39, FIG. 1.

The tracking loop of detectors 100 and 101 are the same as the tracking loop 35, illustrated in FIG. 4, except that quadriphase modulators 121 and 136 are both replaced by biphase modulators, each of which includes a single pseudo noise code generator and a single phase shift key modulator that directly drives a dithered mixer. In the tracking loop of detector 100, the code generators in the biphase modulators that drive the punctual and dithered mixers are identical to the pseudo noise code generator 15, while the tracking loop of detector 101 includes a pair of code generators that are identical to generator 16.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A method of communicating pseudo noise codes having a predetermined chipping rate and first binary data signals each having a bit rate less than an order of magnitude of the chipping rate on the same first carrier, as well as second binary data signals each having a bit rate not restricted by the chipping rate of the first carrier, from a first station to a second station, the second binary data being on a second carrier slightly displaced from the first carrier so that there is frequency overlap in transmitting the noise codes and the first and second data signals, comprising, at the first station: forming a first wave that is a suppressed carrier quadriphase digitally modulated by the pseudo noise code and the first binary data signal, the suppressed carrier of the first wave being the first carrier, forming a second wave that is a suppressed carrier quadriphase digitally modulated by the second data, the suppressed carrier of the second wave being the second carrier, and simultaneously transmitting from the first station to the second station the first and second waves so that the effective isotropic radiated power of the first wave is controlled so as not to degrade the detectability of the second wave at the second station; at the second station: receiving the waves transmitted from the first station, and separating the received second wave from the received first wave.

2. The method of claim 1 further including varying the relative effective isotropic radiated powers of the first and second transmitted waves as a function of the data rate of the second signal.

3. The method of claim 2 wherein the power of the second transmitted wave is increased relative to the power of the first transmitted wave for increasing bit rates of the second data signal.

4. The method of claim 1 wherein the second wave is separated by coherently detecting the received second wave to the exclusion of the received first wave, and in response to the coherently detected received second wave deriving a replica of a source of the second signal.

5. The method of claim 4 further including separating the data modulated on the received first wave from the data modulated on the received second wave by applying the received waves to a matched filter for the pseudo noise code modulating the first wave to derive a high amplitude response containing the signal modulating the first wave and a low amplitude response containing the signal modulating the second wave, and coherently detecting the high amplitude response to the exclusion of the low amplitude response.

6. A transmitter for (a) pseudo noise codes having a predetermined chipping rate, (b) first binary data signals each having a bit rate that is less than an order of magnitude of the chipping rate, and (c) second binary data signals each having a bit rate that is not restricted by the chipping rate comprising means responsive to (a) and (b) for deriving a digital quadriphase modulated, suppressed carrier, first wave having a phase indicative of the combined values of (a) and (b), means responsive to (c) for deriving a digital, quadriphase modulated suppressed carrier second wave having a phase indicative of (c), the frequencies of the suppressed carriers of the first and second waves differing but being closely spaced so that the frequency bands of the first and second waves overlap, and means for combining the first and second waves so that the waves are simultaneously transmitted with the effective isotropic radiated power of the first wave being controlled so as not to degrade the detectability of the second wave at a receiver responsive to the second wave.

7. The transmitter of claim 6 wherein there are provided: a pair of said noise codes ($PN_3$ and $PN_4$) a pair of said first data sources ($d_1$ and $d_2$), and a pair of said second data sources ($d_3$ and $d_4$), and wherein the means for deriving the first waveform includes means responsive to the $PN_3$ and $PN_4$ codes and the $d_1$ and $d_2$ sources for deriving the first wave as $$[PN_3 \oplus d_1] \cos \omega_o t + [PN_4 \oplus d_2] \sin \omega_o t$$

where:

$\omega_O =$ the angular frequency of the carrier of the first wave, wherein the means for deriving the second wave includes means responsive to the $d_3$ and $d_4$ sources for deriving the second wave as:

$$d_3 \cos \omega_s t + d_4 \sin \omega_s t$$

where:

$\omega_s =$ the angular frequency of the carrier of the second wave.

8. The transmitter of claim 7 further including means for linearly combining the first and second waves so that the amplitude of the second wave is considerably greater than that of the first wave.

9. The transmitter of claim 8 wherein the combining means includes means for linearly combining the first and second waves so that the amplitude of the first wave is controlled so as not to degrade the detectability of the second wave at the receiver responsive to the second wave.

10. A remote station for receiving a digital, quadriphase modulated suppressed carrier wave modulated by a pair of pseudo random ranging, noise codes having a predetermined length, said wave being transmitted to the remote station from a base station, said remote station transmitting back to the base station: (a) a pair of locally derived pseudo random ranging noise codes having a predetermined chipping rate and the predetermined length, (b) first binary signals each having a bit rate less than an order of magnitude of the chipping rate, and (c) second binary signals each having a bit rate not restricted by the chipping rate; comprising a source of (a), matched filter means for coherently detecting the pseudo random noise codes modulated on the received wave and for deriving a timing signal in response to the noise codes modulated on the received first wave being correlated to a locally derived source of the codes modulated on the received wave, means for synchronizing the source of (a) with the timing signal, means responsive to the source of (a) and (b) for deriving a digital, quadriphase modulated, suppressed carrier, first wave having a phase indicative of the combined values of (a) and (b), means responsive to (c) for deriving a digital, quadriphase modulated, suppressed carrier second wave having a phase indicative of (c), the frequencies of the suppressed carriers of the first and second waves differing but being closely spaced so that the frequency bands of the first and second waves overlap, and means for simultaneously transmitting the first and second waves so that the effective isotropic radiated power of the first wave is controlled so as not to degrade the detectability of the second wave at the remote station.

11. The station of claim 10 further including means responsive to the received digital, quadriphase modulated suppressed carrier wave and an output of the matched filter means for deriving the suppressed carrier for the first wave.

12. A station for receiving a pair of simultaneously occurring signals having overlapping frequency bands and relatively closely spaced, but different, carrier frequencies, one of said signals being a first suppressed carrier wave that is binary quadriphase modulated by a pair of pseudo noise codes having a predetermined chipping rate and a first binary signal having a bit rate less than of the order of the chipping rate and having an amplitude controlled so as not to degrade the detectability of a second signal being a second suppressed carrier wave that is binary quadriphase modulated by a second binary signal having a bit rate not restricted by the chipping rate, comprising a single signal carrying lead for both of the signals, a coherent detector for the second suppressed carrier for detecting the second binary signal, the coherent detector being coupled to the lead to be responsive to the signals on the lead, matched filter means for the pseudo noise codes, said matched filter means being coupled to the lead to be responsive to the signals on the lead, said matched filter means including means for increasing the amplitude of the first binary signal relative to the second binary signal, and coherent detector means responsive to the increased amplitude first binary signal derived from the matched filter means for detecting the first binary signal, the first binary signal includes a pair of binary sources each of which is separately combined with a different noise code to form the first suppressed carrier wave, and said matched filter means includes first and second means for separately detecting each of the pseudo random codes, said first and second means being separately coupled to the lead, said first means including: means for increasing the amplitude of one of the binary sources relative to the other pseudo noise code and the other binary source, means responsive to the increased amplitude of the one binary source derived from the first means for coherently detecting the one binary source; said second means including: second means for increasing the amplitude of the other binary source relative to the first pseudo noise code and the first binary source, and means responsive to the increased amplitude of the other binary source derived from the second means for coherently detecting the other binary source.

* * * * *